(12) United States Patent
Tan (10) Patent No.: US 11,749,228 B2
(45) Date of Patent: Sep. 5, 2023

(54) METHOD AND DEVICE FOR ADJUSTING DISPLAY BRIGHTNESS OF SCREEN, AND STORAGE MEDIUM

(71) Applicant: BEIJING XIAOMI MOBILE SOFTWARE CO., LTD., Beijing (CN)

(72) Inventor: Wenjing Tan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 26 days.

(21) Appl. No.: 17/489,315

(22) Filed: Sep. 29, 2021

(65) Prior Publication Data

US 2022/0328020 A1    Oct. 13, 2022

(30) Foreign Application Priority Data

Mar. 31, 2021    (CN) .......................... 202110349315.7

(51) Int. Cl.
   *G09G 5/10*    (2006.01)
(52) U.S. Cl.
   CPC ....... *G09G 5/10* (2013.01); *G09G 2320/0646* (2013.01); *G09G 2360/141* (2013.01)
(58) Field of Classification Search
   None
   See application file for complete search history.

(56) References Cited

U.S. PATENT DOCUMENTS

| 2017/0221450 | A1  | 8/2017  | Kim et al. |
| 2020/0027392 | A1  | 1/2020  | Xu |
| 2020/0342800 | A1  | 10/2020 | Li et al. |
| 2022/0208053 | A1* | 6/2022  | Wu ...................... G09G 3/3225 |
| 2022/0301482 | A1* | 9/2022  | Wang .................. G09G 3/3208 |

OTHER PUBLICATIONS

European Patent Application No. 21200150.7 Search and Opinion dated Mar. 21, 2022, 17 pages.

* cited by examiner

*Primary Examiner* — Roberto W Flores
*Assistant Examiner* — Donna V Bocar
(74) *Attorney, Agent, or Firm* — COZEN O'CONNOR (57) ABSTRACT

A method for adjusting the display of a terminal provided with an under-screen image capturing device includes adjusting the brightness of the display above the under-screen image capturing device. First display brightness within a first display region is detected and second display brightness within a second display region is detected when a display screen of a terminal is displaying an image. Grayscale brightness within the first display region is adjusted based on the first display brightness and the second display brightness to allow adjusted grayscale brightness within the first display region to be consistent with grayscale brightness within the second display region.

15 Claims, 7 Drawing Sheets

FIG. 11

METHOD AND DEVICE FOR ADJUSTING DISPLAY BRIGHTNESS OF SCREEN, AND STORAGE MEDIUM

CROSS REFERENCE TO RELATED APPLICATIONS

This application claims priority and benefits to Chinese Application No. 202110349315.7, filed on Mar. 31, 2021, the entire content of which is incorporated herein by reference.

TECHNICAL FIELD

The disclosure relates to a field of image display technologies, and more particularly to a method and a device for adjusting the display brightness of a screen incorporating a camera under the display, and a storage medium.

BACKGROUND

Ongoing developments in technology are placing greater demands on the appearance and display of a user terminal such as a mobile device. The screen occupation ratio for a terminal is the ratio of a display area of the screen to an area of a front panel of the terminal. There is an effort to maximize the display area for a given terminal size, therefore full-screen display technology is one trend in terminal development.

In order to increase the screen occupation ratio, cameras can be arranged behind the display screen, typically referred to as "camera under display (CUP)" technology. The display screen is divided into a CUP region and an AA region. The CUP region, also called the FOV region, corresponds to a field of view of the camera and the AA region is a remaining region of the display screen other than the CUP region. The CUP technology adopts different pixel designs for the CUP region and the AA region respectively. A special pixel design for the CUP region provides improved light transmittance within the FOV region. This provides normal image capture. In addition, an image can be displayed on the whole screen including the FOV region above the screen. The different pixels in each region result in a difference between display brightness within the FOV region and display brightness within the active region of the screen, which makes the user experience poor.

SUMMARY

In one embodiment, a method for adjusting a display brightness of a screen is provided. The method includes: detecting first display brightness within a first display region and detecting second display brightness within a second display region when a display screen of the terminal is displaying an image, the first display region being a region where the under-screen image capturing device is located and the second display region being a remaining region of the display screen of the terminal other than the first display region; and adjusting grayscale brightness within the first display region based on the first display brightness and the second display brightness to allow adjusted grayscale brightness within the first display region to be consistent with grayscale brightness within the second display region.

In one embodiment, an apparatus for adjusting display brightness of a screen is provided. The apparatus includes: a processor, and a memory, for storing computer programs executed by the processor. The processor executes the computer programs stored in the memory to execute a method as described above.

In one embodiment, a non-transitory computer readable storage medium is provided. When computer program stored in the storage medium is executed by a processor of a terminal, the terminal executes a method as described above.

Understandably, the above general description and the following detailed description are only exemplary and explanatory and do not limit the disclosure.

BRIEF DESCRIPTION OF THE DRAWINGS

The drawings herein are incorporated into the specification and constitute a part of the specification, show embodiments in accordance with the disclosure and are used to explain the principle of the disclosure together with the specification.

DETAILED DESCRIPTION

Exemplary embodiments will be described in detail here, and examples thereof are shown in accompanying drawings. When the following description refers to the drawings, unless otherwise indicated, the same numbers in different drawings indicate the same or similar elements. The exemplary described embodiments below do not represent all the embodiments consistent with the disclosure. Rather, they are merely examples of devices consistent with some aspects of the disclosure as detailed in the appended claims.

In order to achieve a beautiful appearance and a large display area on a user terminal, there are development trends focused on increasing the screen occupation ratio of the display. Generally, the terminal is provided with one or more front cameras. The one or more front cameras are arranged on a front panel of the terminal. As a result, arrangement positions of the front cameras may affect the design of the full-screen terminal, in particular the screen occupation ratio. With the development of camera under display (CUP) technology, the camera is placed below a display screen of the terminal where the region of the display screen directly above the camera can be used to display an image without affecting the integrity of the full screen.

Figure 1:
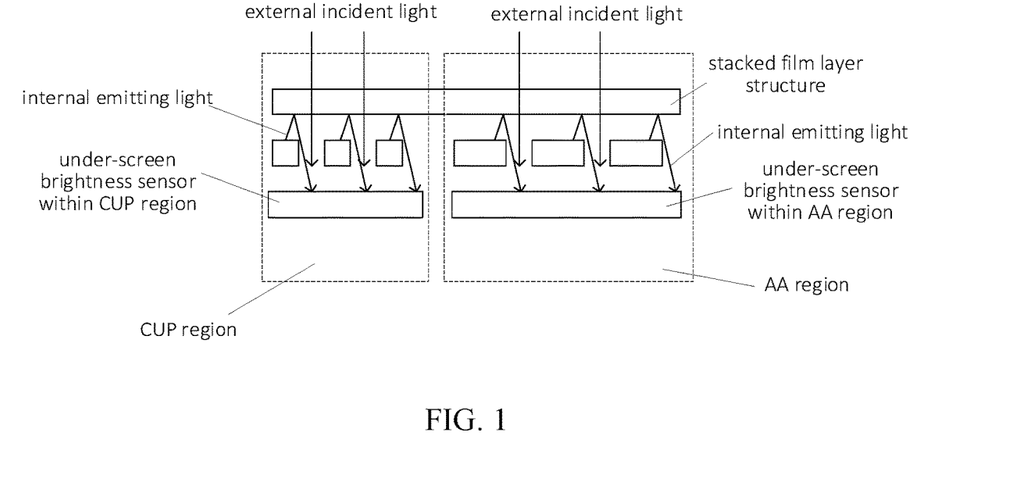
FIG. 1 is a schematic diagram illustrating a light path of an under-screen image capturing device according to some embodiments of the disclosure.

FIG. 1 is a schematic diagram illustrating a light path of an under-screen image capturing device according to some embodiments of the disclosure. It can be understood that, the under-screen image capturing device refers to the image capturing device (such as a camera) arranged below the display screen of the terminal, which can be a CUP. As illustrated in FIG. 1, with the CUP technology, a different pixel design can be adopted within a field of view (FOV) region corresponding to the field of view of the camera from the pixel design adopted within a remaining region (also called active area or AA region) of the screen to improve light transmittance within the FOV region. This arrangement of pixels performs the image capturing operation through the CUP while normally displaying an image on the entire screen including the FOV region. Due to the inconsistent light transmittance between the two regions, the display brightness within the CUP region is different from the display brightness within the remaining region of the display screen other than the CUP region. As a result, when displaying an image on the display screen of the terminal, the display brightness of the display screen is inconsistent, which makes the user experience poor.

Therefore, the disclosure provides a method for adjusting display brightness of a screen, which can adjust the brightness within a region where the under-screen image capturing device is located, such that the brightness of this region is consistent with the display brightness of the remaining region of the display screen of the terminal.

Figure 2:
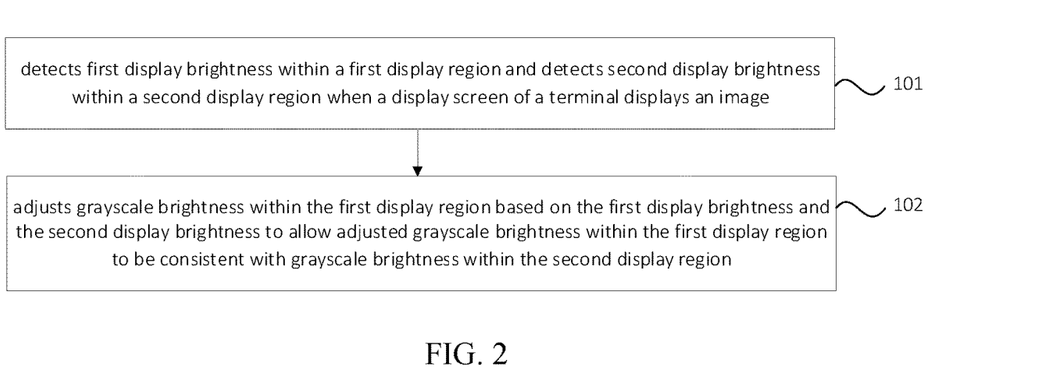
FIG. 2 is a flowchart illustrating a method for adjusting display brightness of a screen according to some embodiments of the disclosure.

FIG. 2 is a flowchart illustrating a method for adjusting display brightness of a screen according to some embodiments of the disclosure. The method is applicable to a terminal provided with an under-screen image capturing device. As illustrated in FIG. 2, the method includes the following.

In block 101, first display brightness within a first display region is detected and second display brightness within a second display region is detected when an image is being displayed on a display screen of the terminal.

In block 102, grayscale brightness within the first display region is adjusted based on the first display brightness and the second display brightness, such that adjusted grayscale brightness within the first display region is consistent with the grayscale brightness within the second display region.

Understandably, the grayscale brightness refers to a collection of R (red) brightness values of R pixels, G (green) brightness values of G pixels, and B (blue) brightness values of B pixels of the display screen. The grayscale brightness within the first display region is adjusted by adjusting the R brightness values of all the R pixels, the G brightness values of all the G pixels, and the B brightness values of the all the B pixels within the first display region of the display screen.

With the disclosure, the terminal is provided with the under-screen image capturing device, the CUP region of the screen where the under-screen image capturing device is located is provided with a different pixel design from that provided within the AA region of the screen to increase the light transmission within the CUP region. For example, a different drive circuit design or a different light-emitting area design can be adopted within the CUP region. Therefore, the image can be captured normally through the under-screen image capturing device. The first display region is a region where the under-screen image capturing device located, which is called, for example, the CUP region. The second display region is the remaining region of the display screen of the terminal other than the first display region, which is called, for example, the active region or AA region.

Figure 3:
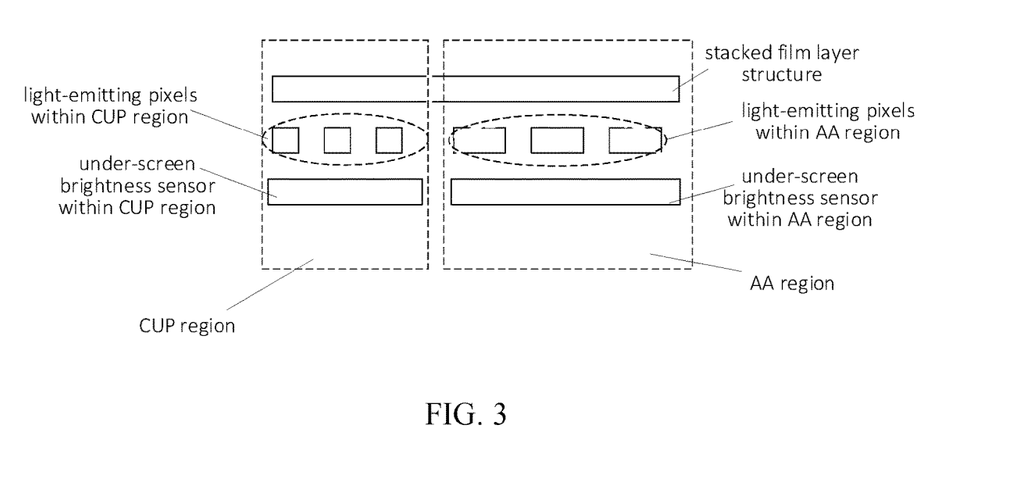
FIG. 3 is a schematic diagram illustrating a screen of a terminal provided with an under-screen image capturing device according to some embodiments of the disclosure.

FIG. 3 is a schematic diagram illustrating a screen of a terminal provided with an under-screen image capturing device according to some embodiments of the disclosure. As illustrated in FIG. 3, multi-layer films (or a stacked film layer structure) are arranged above a light-emitting layer of the display screen of the terminal. While the display screen of the screen is displaying an image, the first display brightness within the CUP region and the second display brightness within the AA region are detected. The first display brightness within the CUP region can be detected by the image capturing device, or the first display brightness within the CUP region can be detected by an under-screen brightness sensor arranged within the CUP region. The second display brightness within the AA region can be detected by an under-screen brightness sensor provided within the AA region. It can be understood that, the under-screen brightness sensors within the CUP region and the AA region of the display screen of the terminal may be brightness sensors existing in the terminal or additional.

In the disclosure, the first display brightness and the second display brightness are compared with each other and the grayscale brightness within the CUP region is adjusted based on the second display brightness within the AA region, such that the display brightness within the CUP region is consistent with the display brightness within the AA region of the display screen of the terminal.

With the disclosure, when the display screen of the terminal is displaying an image, the first display brightness within the region where the under-screen image capturing device is located is detected and the second display brightness within the remaining region of the display screen of the terminal other than the first display region is detected. The grayscale brightness within the first display region is adjusted based on the first display brightness and the second display brightness such that the adjusted grayscale brightness within the first display region is consistent with the grayscale brightness within the second display region. Therefore, the difference between the display brightness within the region where the under-screen image capturing device is located and the display brightness within the remaining region of the display screen of the terminal can be reduced, to improve an image display quality of the terminal.

Figure 4:
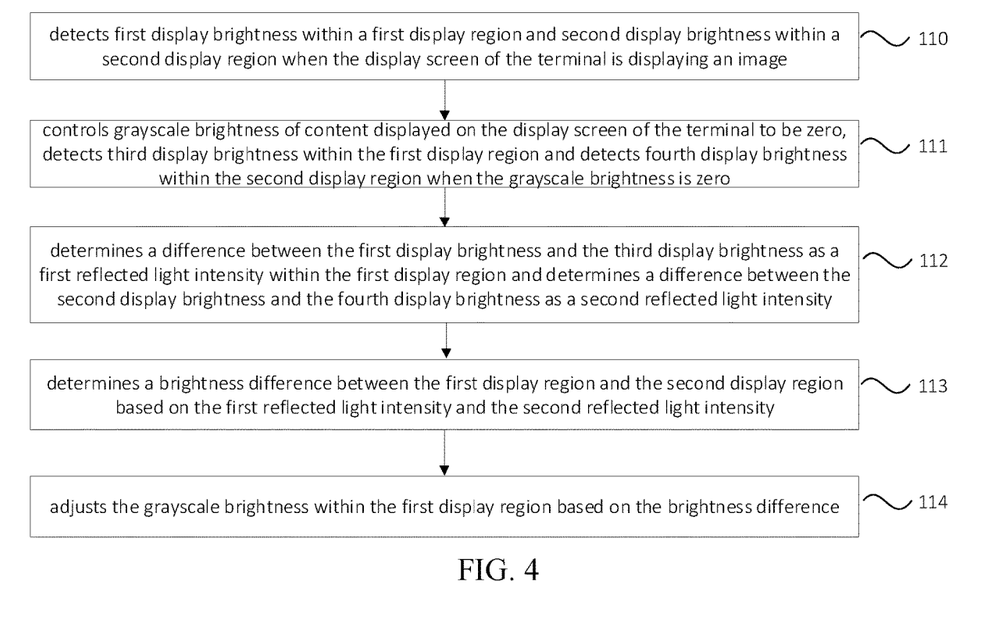
FIG. 4 is a flowchart illustrating a method for adjusting grayscale brightness of a first display region according to some embodiments of the disclosure.

FIG. 4 is a flowchart illustrating a method for adjusting grayscale brightness within a first display region according to some embodiments of the disclosure. As illustrated in FIG. 4, the method may include the following.

In block 110, first display brightness within a first display region is detected and second display brightness within a second display region is detected when the display screen of the terminal is displaying an image.

In block 111, the grayscale brightness of content displayed on the display screen of the terminal is controlled to be zero for a preset period, third display brightness within the first display region is detected and fourth display brightness within the second display region is detected when the grayscale brightness of the display screen of the terminal is zero.

In block 112, a difference between the first display brightness and the third display brightness is determined as a first reflected light intensity within the first display region, and a difference between the second display brightness and the fourth display brightness is determined as a second reflected light intensity within the second display region.

In block 113, a brightness difference between the first display region and the second display region is determined based on the first reflected light intensity and the second reflected light intensity.

In block 114, the grayscale brightness within the first display region is adjusted based on the brightness difference.

Details of the block 114 correspond to related descriptions of FIG. 1, which are not repeated here.

While the display screen of the terminal is displaying an image, the first display brightness within the CUP region and the second display brightness within the AA region are detected. As illustrated in FIG. 1, due to different pixel designs of the CUP region and the AA region, the light paths of the reflected light within different regions of the display screen are different from each other. In addition, since the under-screen brightness sensors within the AA region and the CUP region are arranged closely to each other, a light interference may occur between the AA region and the CUP region to change the brightness within the AA region and the brightness within the CUP region, i.e., the accuracy of results may be affected by the determination of incident light intensity within the AA region and the CUP region. A black frame insertion single may be generated based on a black frame insertion method. For example, the grayscale brightness of the content displayed on the display screen of the terminal may be controlled to be zero for a preset period, i.e., the terminal displays a black frame. While the display screen of the terminal is displaying a black frame (i.e., the grayscale brightness of the display screen of the terminal is zero), the third display brightness corresponding to the CUP region and the fourth display brightness corresponding to the AA region are detected. The first reflected light intensity within the CUP region is the difference between the first display brightness and the third display brightness and the second reflected light intensity within the AA region is the difference between the second display brightness and the fourth display brightness. The brightness difference between the first display region and the second display region is determined based on the first reflected light intensity within the CUP region and the second reflected light intensity within the AA region. The grayscale brightness within the first display region that is obtained when the display screen is displaying an image is adjusted based on the brightness difference to make the adjusted grayscale brightness within the first display region to be consistent with the grayscale brightness within the second display region. For example, given the first display brightness within the CUP region is $L_C$, the second display brightness within the AA region is $L_A$, the third display brightness within the CUP region is $L_{CB}$ and the fourth display brightness within the AA region is $L_{AB}$ when the grayscale brightness of the display screen of the terminal is zero, the first reflected light intensity within the CUP region can be expressed as $L_{CR}=L_C-L_{CB}$ and the second reflected light intensity within the AA region can be expressed as $L_{AR}=L_A-L_{AB}$.

With the disclosure, while the display screen of the terminal is displaying an image, the first display brightness within the first display region where the under-screen image capturing device is located is detected and the second display brightness within other display regions of the display screen of the terminal other than the first display region is detected. When the grayscale brightness of the content displayed on the display screen of the terminal is zero for a preset period, the third display brightness within the first display region is detected and the fourth display brightness within the second display region is detected. The difference between the first display brightness and the third display brightness is determined as the first reflected light intensity within the first display region. The difference between the second display brightness and the fourth display brightness is determined as the second reflected light intensity within the second display region. The brightness difference between the first display region and the second display region is determined based on the first reflected light intensity and the second reflected light intensity. The grayscale brightness of the first display region when the display screen is displaying an image is adjusted based on the brightness difference such that the adjusted grayscale brightness within the first display region is consistent with the grayscale brightness within the second display region. The display brightness difference between the region where the under-screen image capturing device is located and the remaining region of the display screen of the terminal is reduced, to achieve real-time uniformity of the display brightness of the terminal.

Figure 5:
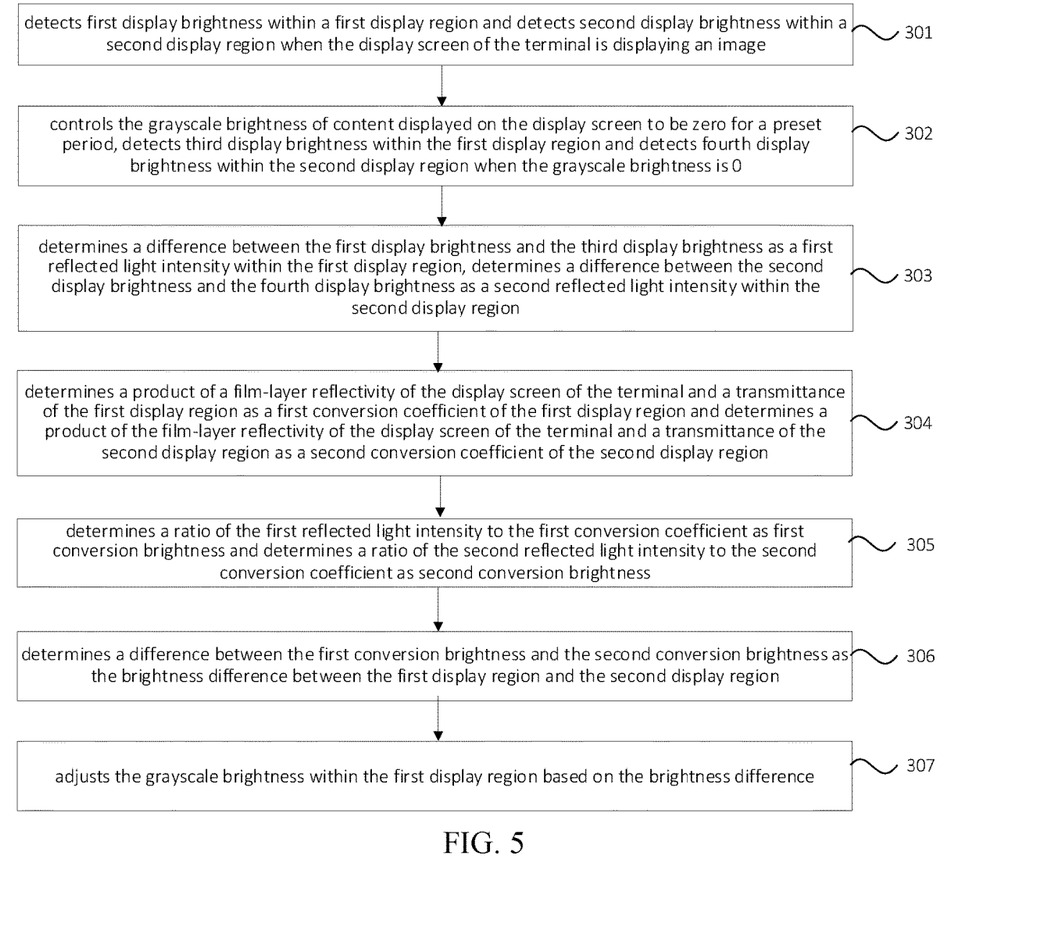
FIG. 5 is a flowchart illustrating a method for determining a brightness difference between a first display region and a second display region according to some embodiments of the disclosure.

FIG. 5 is a flowchart illustrating a method for determining a brightness difference between a first display region and a second display region according to some embodiments of the disclosure. As illustrated in FIG. 5, the method for determining the brightness difference between the first display region and the second display region may include the following.

In block 301, first display brightness within a first display region is detected and second display brightness within a second display region is detected when the display screen of the terminal is displaying an image.

In block 302, the grayscale brightness of content displayed on the display screen of the terminal is controlled to be zero for a preset period, third display brightness within the first display region is detected and fourth display brightness within the second display region is detected when the grayscale brightness of the display screen of the terminal is zero.

In block 303, a difference between the first display brightness and the third display brightness is determined as a first reflected light intensity within the first display region, and a difference between the second display brightness and the fourth display brightness is determined as a second reflected light intensity within the second display region.

In block 304, a product of a film-layer reflectivity of the display screen of the terminal and a transmittance of the first display region is determined as a first conversion coefficient of the first display region, and a product of the film-layer reflectivity of the display screen and a transmittance of the second display region is determined as a second conversion coefficient of the second display region.

In block 305, a ratio of the first reflected light intensity to the first conversion coefficient is determined as first conversion brightness, and a ratio of the second reflected light intensity to the second conversion coefficient is determined as second conversion brightness.

In block 306, a difference between the first conversion brightness and the second conversion brightness is determined as the brightness difference between the first display region and the second display region.

In block 307, the grayscale brightness within the first display region is adjusted based on the brightness difference.

Details of the block 301 correspond to related descriptions of FIG. 1, which are not repeated herein. Details of the blocks 302-303 and 307 correspond to related descriptions of FIG. 2, which are not repeated here.

With the disclosure, the first display brightness within the CUP region is detected and the second display brightness within the AA region is detected. When the grayscale brightness of the display screen of the terminal is zero for the preset period, the third display brightness corresponding to the CUP region is detected and the fourth display brightness corresponding to the AA region is detected. The first reflected light intensity within the CUP region is the difference between the first display brightness and the third display brightness. The second reflected light intensity within the AA region is the difference between the second display brightness and the fourth display brightness. The product of the film-layer reflectivity of the display screen and the transmittance of the CUP region is determined as the first conversion coefficient of the CUP region. The product of the film-layer reflectivity of the display screen of the terminal and the transmittance of the AA region is determined as the second conversion coefficient of the AA region. The ratio of the first reflected light intensity to the first conversion coefficient is determined as the first conversion brightness and the ratio of the second reflected light intensity to the second conversion coefficient is determined as the second conversion brightness. The difference between the first conversion brightness and the second conversion brightness is determined as the brightness difference between the CUP region and the AA region. The grayscale brightness within the CUP region that is obtained when the display screen is displaying an image is adjusted based on the brightness difference such that the adjusted grayscale brightness within the CUP region is consistent with the grayscale brightness within the AA region. For example, given the first display brightness within the CUP region is $L_C$, the second display brightness within the AA region is $L_A$, the third display brightness corresponding to the CUP region is $L_{CB}$ and the fourth display brightness corresponding to the AA region is $L_{AB}$ when the grayscale brightness of content displayed on the display screen of the terminal is zero, the first reflected light intensity of the CUP region is represented as $L_{CR}=L_C-L_{CB}$ and the second reflected light intensity of the AA region is represented as $L_{AR}=L_A-L_{AB}$. Given reflectivity of a stacked film layer structure (i.e., the film-layer reflectivity) is F, the transmittance of the under-screen light sensor below the AA region is $A_1$ and the transmittance of the under-screen light sensor below the CUP region is $A_2$, the first conversion coefficient of the CUP region can be represented as $F \times A_2$, the second conversion coefficient of the AA region can be represented as $F \times A_1$, the first conversion brightness of the CUP region is $$\frac{L_C - L_{CB}}{F \times A_2},$$

the second conversion brightness of the AA region is $$\frac{L_A - L_{AB}}{F \times A_1},$$

and the brightness difference $\Delta L_{CA}$ between the CUP region and the AA region is $$\Delta L_{CA} = \frac{L_C - L_{CB}}{F * A_2} - \frac{L_A - L_{AB}}{F * A_1}.$$

When the display screen of the terminal is displaying an image, the first display brightness within the region where the under-screen image capturing device is located is detected and the second display brightness within the remaining region of the display screen of the terminal other than the first display region is detected. When the grayscale brightness of content displayed on the display screen of the terminal is zero, the third display brightness corresponding to the first display region is detected and the fourth display brightness corresponding to the second display region is detected. The difference between the first display brightness and the third display brightness is determined as the first reflected light intensity of the first display region and the difference between the second display brightness and the fourth display brightness is determined as the second reflected light intensity of the second display region. The brightness difference between the first display region and the second display region is determined based on the first reflected light intensity and the second reflected light intensity. The grayscale brightness within the first display region that is obtained when the display screen is displaying the image is adjusted based on the brightness difference when the display screen is displaying an image such that the adjusted grayscale brightness within the first display region is consistent with the grayscale brightness within the second display region. Therefore, the display brightness difference between the region where the under-screen image capturing device is located and the remaining region of the display screen of the terminal is reduced to achieve uniformity of the display brightness of the terminal.

Figure 6:
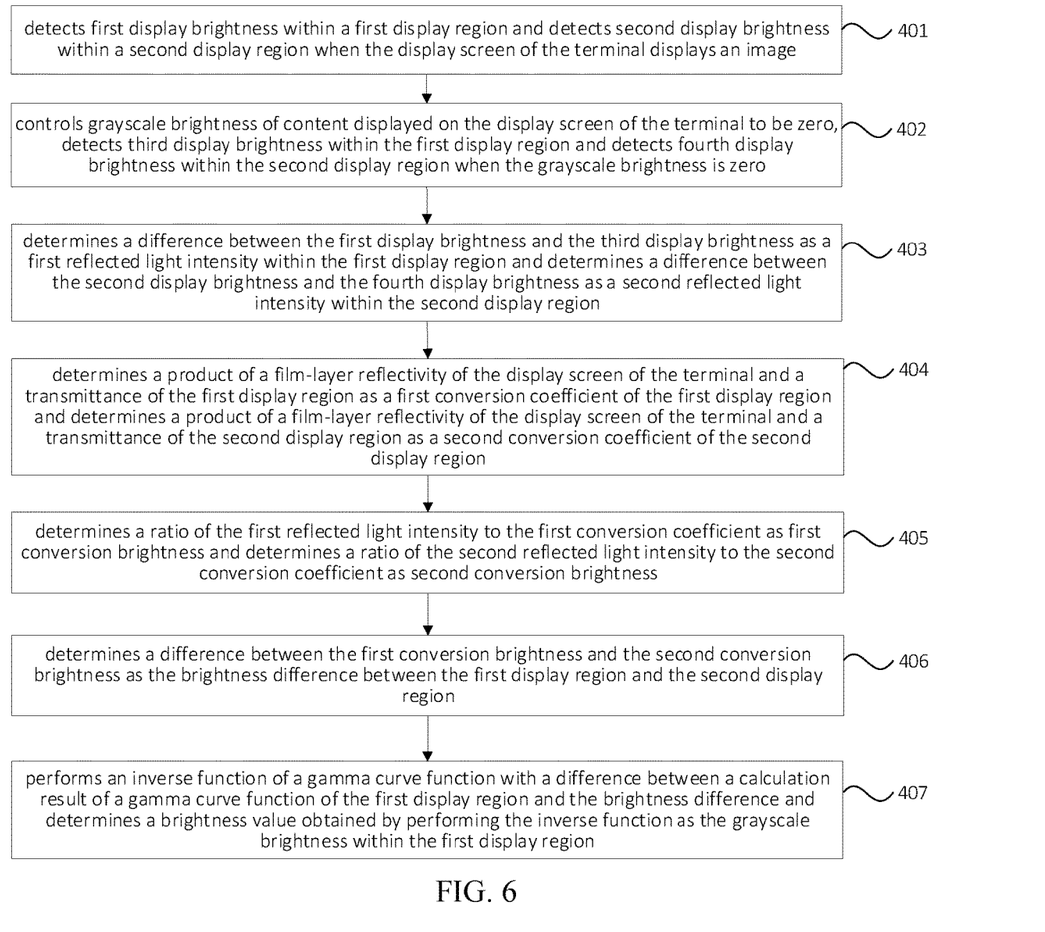
FIG. 6 is a flowchart illustrating a method for adjusting display brightness of a screen according to some embodiments of the disclosure.

FIG. 6 is a flowchart illustrating a method for adjusting display brightness of a screen according to some embodiments of the disclosure. As illustrated in FIG. 6, the method for adjusting the display brightness of the screen may include the following.

In block 401, the first display brightness within the first display region is detected and the second display brightness within the second display region is detected when the display screen of the terminal is displaying an image.

In block 402, the grayscale brightness of the content displayed on the display screen is controlled to be zero for s preset period, the third display brightness corresponding to the first display region is detected and the fourth display brightness corresponding to the second display region is detected when the grayscale brightness of the content displayed on the display screen of the terminal is zero.

In block 403, the difference between the first display brightness and the third display brightness is determined as the first reflected light intensity of the first display region and the difference between the second display brightness and the fourth display brightness is determined as the second reflected light intensity of the second display region.

In block 404, a product of a film-layer reflectivity of the display screen of the terminal and a transmittance of the first display region is determined as a first conversion coefficient of the first display region, and a product of the film-layer reflectivity of the display screen and a transmittance of the second display region is determined as a second conversion coefficient of the second display region.

In block 405, a ratio of the first reflected light intensity to the first conversion coefficient is determined as first conversion brightness, and a ratio of the second reflected light intensity to the second conversion coefficient is determined as second conversion brightness.

In block 406, a difference between the first conversion brightness and the second conversion brightness is determined as the brightness difference between the first display region and the second display region.

In block 407, an inverse function of a gamma curve function is performed with a difference between a calculation result of a gamma curve function of the first display region and the brightness difference, and a brightness value obtained by performing the inverse function is determined as the grayscale brightness within the first display region.

Details of the block 401 correspond to related descriptions of FIG. 1, which are not repeated herein. Details of the blocks 402-403 correspond to related descriptions of FIG. 2, which is not repeated here. Details of the blocks 404-406 correspond to related descriptions of FIG. 3, which are not repeated here.

In the disclosure, the first display brightness within the CUP region is detected and the second display brightness within the AA region is detected. The third display brightness corresponding to the CUP region is detected and the fourth display brightness corresponding to the AA region when the grayscale brightness within the display screen of the terminal is zero. The first reflected light intensity within the CUP region is the difference between the first display brightness and the third display brightness and the second reflected light intensity within the AA region is the difference between the second display brightness and the fourth display brightness. The product of the film-layer reflectivity of the display screen of the terminal and the transmittance of the CUP region is determined as the first conversion coefficient of the CUP region and the product of the film-layer reflectivity of the display screen of the terminal and the transmittance of the AA region is determined as the second conversion coefficient of the second display region. The ratio of the first reflected light intensity to the first conversion coefficient is determined as the first conversion brightness and the ratio of the second reflected light intensity to the second conversion coefficient is determined as the second conversion brightness. The difference between the first conversion brightness and the second conversion brightness is determined as the brightness difference between the CUP region and the AA region. The inverse function of the gamma curve function is performed with the difference between the calculation result of the gamma curve function in the CUP region and the brightness difference, and the brightness value obtained by performing the inverse function is determined as the grayscale brightness within the CUP region obtained when the display screen is displaying the image to make the adjusted grayscale brightness within the CUP region consistent with the grayscale brightness within the AA region. For example, given the first display brightness within the CUP region is $L_C$, the second display brightness within the AA region is $L_A$, the third display brightness corresponding to the CUP region is $L_{CB}$ and the fourth display brightness corresponding to the AA region is $L_{AB}$ when the grayscale brightness of the display screen of the terminal is zero, the first reflected light intensity of the CUP region may be expressed as $L_{CR}=L_C-L_{CB}$, and the second reflected light intensity of the AA region may be expressed as $L_{AR}=L_A-L_{AB}$. Given reflectivity of the stacked film layer structure (i.e., the film-layer reflectivity) is F, the light transmittance from the AA region to the under-screen light sensor is $A_1$, and the light transmittance from the CUP region to the under-screen light sensor is $A_2$, the first conversion coefficient of the CUP region can be expressed as $F \times A_2$ the second conversion coefficient of the AA region can be expressed as $F \times A_1$, the first conversion brightness of the CUP region is $$\frac{L_C - L_{CB}}{F \times A_2},$$

the second conversion brightness of the AA region is $$\frac{L_A - L_{AB}}{F \times A_1},$$

and the brightness difference between the CUP region and the AA region $\Delta L_{CA}$ is:

$$\Delta L_{CA} = \frac{L_C - L_{CB}}{F * A_2} - \frac{L_A - L_{AB}}{F * A_1}.$$

For an $i^{th}$ pixel of the CUP region, given the gamma curve function of the CUP region is $f_c(Gray_i)$, taking the brightness of the AA region as a target, a target value of the grayscale brightness of the CUP region is determined, which can be expressed as:

$$Gray_i' = f_c^{-1}(f_c(Gray_i) - \Delta L_{CA}).$$

That is, the grayscale brightness of the $i^{th}$ pixel in the CUP region is adjusted to $Gray_i'$, so that the display brightness within the CUP area is the same with the display brightness within the AA region.

With the disclosure, when the display screen of the terminal is displaying an image, the first display brightness within the region where the under-screen image capturing device is located is detected and the second display brightness within the remaining region of the display screen of the terminal other than the first display region is detected. When the grayscale brightness of the content displayed on the display screen of the terminal is zero, the third display brightness corresponding to the first display region and the fourth display brightness corresponding to the second display region are detected. The difference between the first display brightness and the third display brightness is used as the first reflected light intensity corresponding to the first display region. The difference between the second display brightness and the fourth display brightness is used as the second reflected light intensity corresponding to the second display region. The brightness difference between the first display region and the second display region is determined based on the first reflected light intensity and the second reflected light intensity. The grayscale brightness within the first display region obtained when the display screen is displaying the image is adjusted based on the brightness difference to allow the adjusted grayscale brightness within the first display region is consistent with the grayscale brightness within the second display region. Therefore, the difference between the display brightness within the region where the under-screen image capturing device is located and the display brightness within the remaining region of the display screen of the terminal is reduced, to realize real-time uniformity of the display brightness of the terminal.

Figure 7:
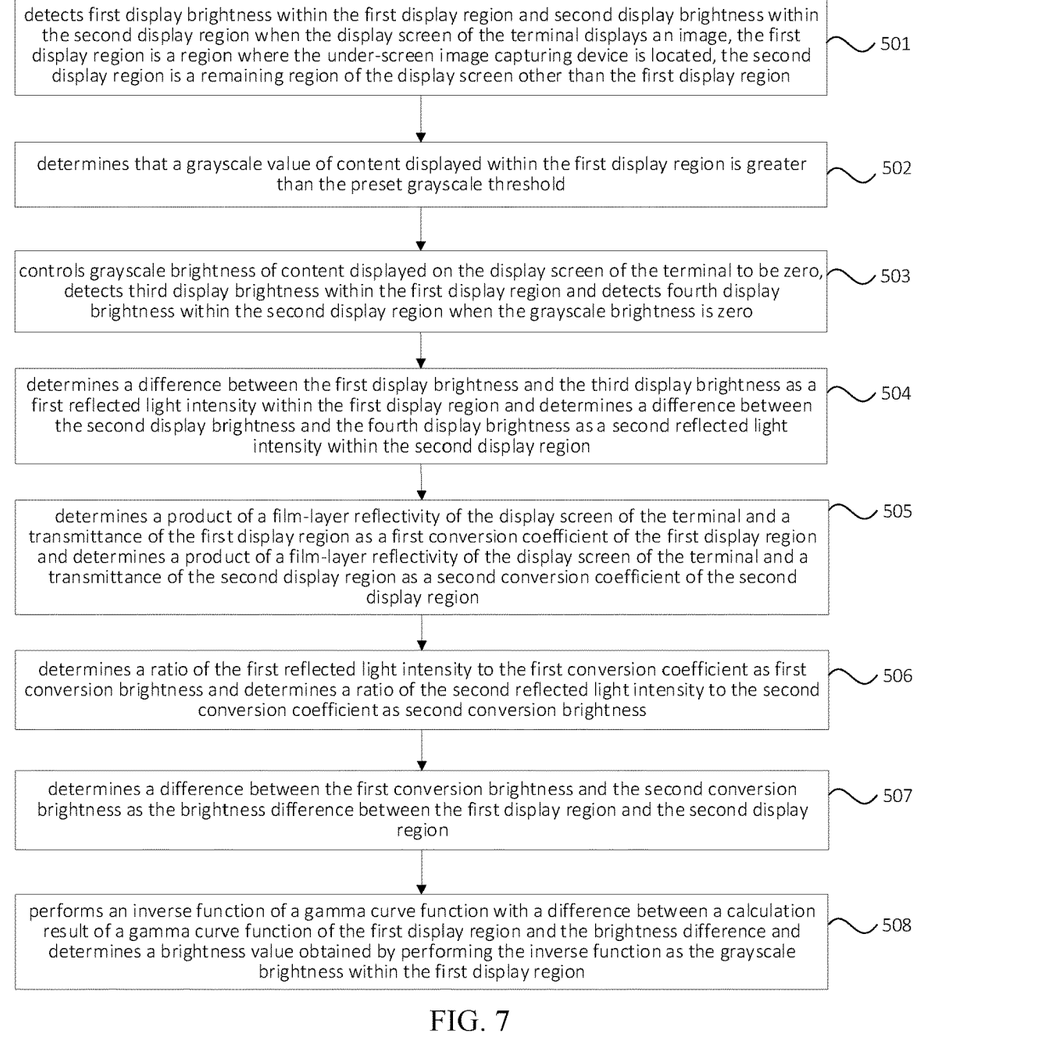
FIG. 7 is another flowchart illustrating a method for adjusting display brightness of a screen according to some embodiments of the disclosure.

FIG. 7 is flowchart illustrating a method for adjusting display brightness of a screen according to some embodiments of the disclosure. As illustrated in FIG. 7, the method for adjusting display brightness of a screen may include the following.

In block 501, the first display brightness within the first display region is detected and the second display brightness within the second display region is detected while an image is displayed on the display screen of the terminal. The first display region is a region where the under-screen image imaging device is located. The second display region is the remaining region of the display screen of the terminal other than the first display region.

In block 502, it is determined that the grayscale value of the content displayed within the first display region is greater than a preset grayscale threshold.

In block 503, the grayscale brightness of the content displayed on the display screen is controlled to be zero for s preset period, the third display brightness corresponding to the first display region is detected and the fourth display brightness corresponding to the second display region is detected when the grayscale brightness of the content displayed on the display screen of the terminal is zero.

In block 504, the difference between the first display brightness and the third display brightness is determined as the first reflected light intensity of the first display region and the difference between the second display brightness and the fourth display brightness is determined as the second reflected light intensity of the second display region.

In block 505, a product of a film-layer reflectivity of the display screen of the terminal and a transmittance of the first display region is determined as a first conversion coefficient of the first display region, and a product of the film-layer reflectivity of the display screen and a transmittance of the second display region is determined as a second conversion coefficient of the second display region.

In block 506, a ratio of the first reflected light intensity to the first conversion coefficient is determined as first conversion brightness, and a ratio of the second reflected light intensity to the second conversion coefficient is determined as second conversion brightness.

In block 507, a difference between the first conversion brightness and the second conversion brightness is determined as the brightness difference between the first display region and the second display region.

In block 508, an inverse function of a gamma curve function is performed with a difference between a calculation result of a gamma curve function of the first display region and the brightness difference, and a brightness value obtained by performing the inverse function is determined as the grayscale brightness within the first display region.

Details of the blocks 503-508 correspond to related descriptions of FIG. 4, which are not repeated herein.

In the disclosure, when the display screen of the terminal is displaying an image, the first display brightness within the CUP region is detected and the second display brightness with the AA region is detected. While the display screen of the terminal is displaying a solid color image or a transient image whose color gradually changes, the difference between the brightness within the CUP region and the brightness within the AA region is obvious, that is, the adjustment of the display brightness within the CUP region may be applied to an image corresponding to a pure-grayscale map or a grayscale-like map. The method for adjusting display brightness of a screen is to adjust the display brightness difference of these two types of images. The image corresponding to a pure-grayscale map refers to that the grayscale values on R (red), G (green) and B (blue) channels are the same with each other for each pixel of the image. The image corresponding to a grayscale-like map refers to that grayscale values on the R, G, B channels are closed to each other for each pixel of the image, i.e., differences between the grayscale values on each two channels are smaller than a preset threshold for each pixel of the image.

When it is determined that the grayscale value (or grayscale brightness) of the content displayed within the CUP region is greater than the preset grayscale brightness, i.e., the content displayed within the CUP region is an image corresponding to a pure-grayscale map or a grayscale-like map, the display brightness of the screen is adjusted to reduce the difference of the display brightness when the content displayed on the screen is an image corresponding to the pure-grayscale map or the grayscale-like map.

In the disclosure, when the display screen of the terminal is displaying an image and it is determined that the grayscale value of the content displayed within the first display region is greater than the preset grayscale threshold (i.e., the content displayed within the first display region is an image corresponding to the pure-grayscale map or the grayscale-like map), the brightness of the display brightness of the screen is adjusted to reduce the difference between the display brightness within the region where the under-screen image capturing device is located and the display brightness within the remaining region of the display screen of the terminal, to achieve real-time uniformity of the display brightness display of the terminal.

Figure 8:
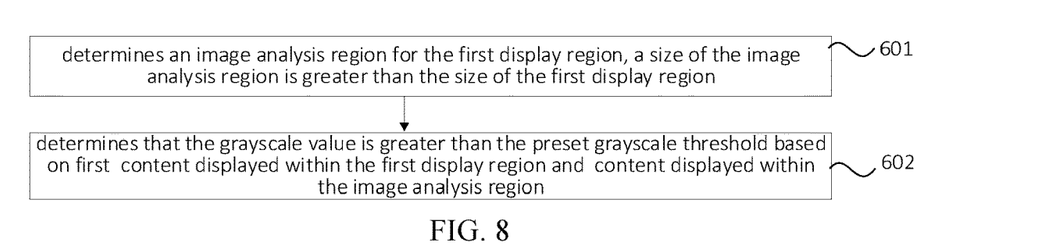
FIG. 8 is a flowchart illustrating a method for determining that a grayscale value of content displayed within a first display region is greater than a preset grayscale threshold according to some embodiments of the disclosure.

FIG. 8 is a flowchart illustrating a method for determining that the grayscale of the content displayed within the first display region is greater than the preset grayscale threshold according to some embodiments of the disclosure. As illustrated in FIG. 8, the method for determining that the content displayed within the first display region is greater than the preset grayscale threshold may include the following.

In block S601, an image analysis region is determined for the first display region. The size of the image analysis region is greater than the size of the first display region.

In block S602, it is determined that the grayscale value is greater than the preset grayscale threshold based on the content displayed within the first display region and the content displayed within the image analysis region.

Understandably, the first display region is within the image analysis region.

In the disclosure, when the display screen of the terminal is displaying a solid color image or a transient image, the brightness difference between the content displayed within the CUP region and the content displayed within the AA region is obvious. When it is determined that the grayscale value of the content displayed within the CUP region is greater than the preset grayscale threshold (i.e., the content displayed within the CUP is an image corresponding to the pure-grayscale map or the grayscale-like map), the display brightness of the screen is adjusted to reduce the brightness difference caused due to the display of an image corresponding to the pure-grayscale map and the grayscale-like map on the display screen.

Figure 9:
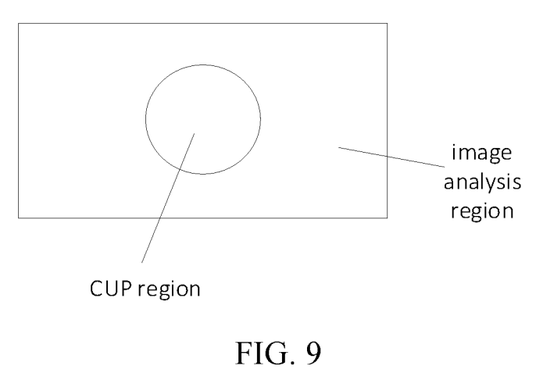
FIG. 9 is a schematic diagram illustrating a method for determining an image analysis region for a first display region according to some embodiments of the disclosure.

FIG. 9 is a schematic diagram illustrating an image analysis region for a first display region according to some embodiments of the disclosure. As illustrated in FIG. 9, the image analysis region is determined for the CUP region. The size of the image analysis region is greater than the size of the CUP region and the CUP region is within the image analysis region. In an example, the length of a side of the image analysis region for the CUP region is twice (or other multiples of more than twice) the length of a side of the CUP region. For example, the image analysis region APic having m rows and n columns can be determined by a processor of the terminal, the content displayed within the image analysis region APic is determined and the content CPic displayed within the CUP region is determined. It can be understood that, when the grayscale values on the R, G, and B channels of an image are equal each other (i.e., R=G=B), the image is an image corresponding to the pure-grayscale map. When differences between the grayscale values on the R, G and B channels of an image are all less than a preset threshold, the image is an image corresponding to the grayscale-like map.

The light sensor of the terminal is generally a single-channel brightness sensor. The above-mentioned method for adjusting display brightness has a good effect on an image corresponding to the grayscale map and the grayscale-like map. In a condition of requiring a calibration to improve consistency of brightness and color of a color image, a 3-channel color sensor can be used to obtain RGB signals for brightness and color calibration. It can be understood that a color light sensor can be provided under the display screen of the terminal to obtain R, G and B brightness components. The first display brightness within the first display region can be compared with the second display brightness within the second display region based on the obtained R, G and B brightness components to adjust the R, G and B brightness component within the first display region to reduce or eliminate the difference between the display brightness within the first display region and the display brightness within the second display region of the display screen of the terminal. In the disclosure, when the display screen of the terminal is displaying an image and it is determined that the grayscale value of the content displayed within the first display region is greater than the preset grayscale threshold (i.e., the content displayed within the first display region corresponds to the pure-grayscale map or a grayscale-like map), the display brightness of the screen is adjusted to reduce the difference between the display brightness within the region where the under-screen image capturing device is located and the display brightness within the remaining region of the display screen of the terminal and achieve the real-time uniformity of the display brightness of the terminal. Based on the same concept, embodiments of the disclosure also provide a device for adjusting display brightness of a screen.

Understandably, in order to implement the above-mentioned functions, the apparatus according to the disclosure includes hardware structures and/or software modules corresponding to each function. In combination with the units and algorithm steps of examples according to the disclosure, embodiments of the disclosure can be implemented in the form of hardware, computer software or a combination thereof. Whether a certain function is executed by hardware or computer software-driven hardware depends on specific application and design constraint conditions of the technical solution. Those skilled in the art can use different methods for each specific application to implement the described functions, but such implementation should not be considered as going beyond the scope of the technical solutions according to the disclosure.

Figure 10:
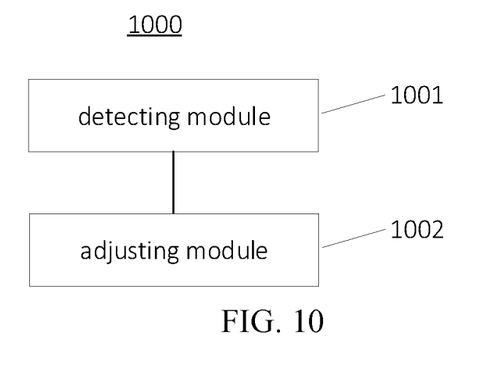
FIG. 10 is a block diagram illustrating a device for adjusting display brightness of a screen according to some embodiments of the disclosure.

FIG. 10 is a block diagram illustrating a device for adjusting display brightness of a screen according to some embodiments of the disclosure. As illustrated in FIG. 10, the device is integrated into a terminal and the terminal is provided with an under-screen image capturing device. The device 1000 for adjusting display brightness of a screen may include a detecting module 1001 and an adjusting module 1002.

The detecting module 1001 is configured to detect first display brightness within a first display region and detect second display brightness within a second display region when a display screen of the terminal is displaying an image. The first display region is a region where the under-screen image capturing device is located. The second display region is a remaining region of the display screen of the terminal other than the first display region.

The adjusting module 1002 is configured to adjust grayscale brightness within the first display region based on the first display brightness and the second display brightness to make adjusted grayscale brightness within the first display region to be consistent with the grayscale brightness within the second display region.

In an example, the adjusting module 1002 is configured to adjust the grayscale brightness within the first display region based on the first display brightness and the second display brightness by the following.

The grayscale brightness of content displayed on the display screen of the terminal is controlled to be zero. Third display brightness corresponding to the first display region is detected and fourth display brightness corresponding to the second display region is detected when the grayscale brightness of the display screen of the terminal is zero, A difference between the first display brightness and the third display brightness is determined as a first reflected light intensity within the first display region. A difference between the second display brightness and the fourth display brightness is determined as a second reflected light intensity.

A brightness difference between the first display region and the second display region is determined based on the first reflected light intensity and the second reflected light intensity.

The grayscale brightness within the first display region is adjusted based on the brightness difference.

In an example, the adjusting module 1002 is configured to determine the brightness difference between the first display region and the second display region based on the first reflected light intensity and the second reflected light intensity by the following.

A product of a film-layer reflectivity of the display screen of the terminal and a transmittance of the first display region is determined as a first conversion coefficient of the first display region. A product of the film-layer reflectivity of the display screen of the terminal and a transmittance of the second display region is determined as a second conversion coefficient of the second display region.

A ratio of the first reflected light intensity to the first conversion coefficient is determined as first conversion brightness. A ratio of the second reflected light intensity to the second conversion coefficient is determined as second conversion brightness.

A difference between the first conversion brightness and the second conversion brightness is determined as the brightness difference between the first display region and the second display region.

In an example, the adjusting module 1002 is configured to adjust the grayscale brightness within the first display region based on the brightness difference by the following.

An inverse function of a gamma curve function is performed with a difference between a calculation result of a gamma curve function of the first display region and the brightness difference. A brightness value obtained by performing the inverse function is determined as the grayscale brightness within the first display region.

In an example, the adjusting module 1002 is further configured to determine that the grayscale value of content displayed within the first display region is greater than the preset grayscale threshold.

In an example, the adjusting module 1002 is configured to determine that the grayscale value of content displayed within the first display region is greater than the preset grayscale threshold by the following.

An image analysis region is determined for the first display region. The size of the image analysis region is greater than the size of the first display region.

It is determined that the grayscale value is greater than the preset grayscale threshold based on content displayed within the first display region and the content displayed within the image analysis region.

Implementations of each module have been described in detail in the method embodiments, which is not repeated here.

Figure 11:
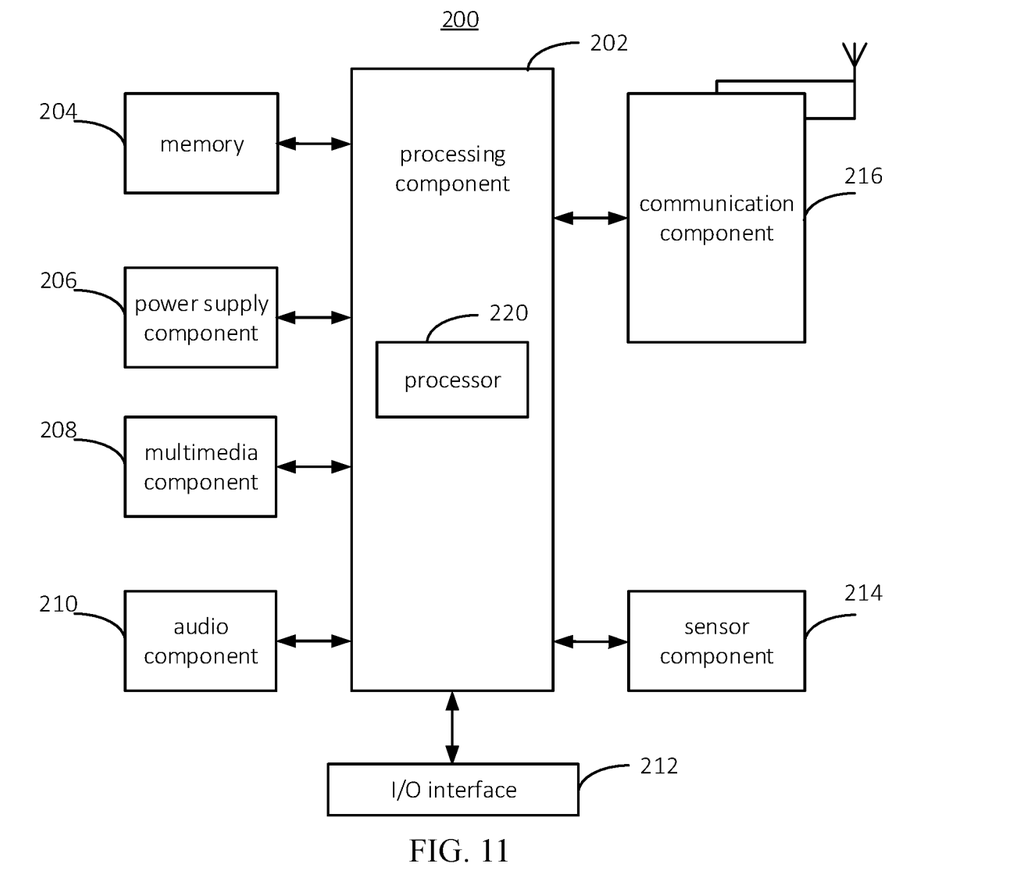
FIG. 11 is a block diagram illustrating a terminal for implementing a method for adjusting display brightness of a screen according to some embodiments of the disclosure.

FIG. 11 is a block diagram illustrating a terminal for adjusting display brightness of a screen according to some embodiments of the disclosure. For example, the terminal 200 may be a mobile phone, a computer, a digital broadcasting device, a message transmitting device, a game console, a tablet device, a medical device, a fitness device, a personal digital assistant, etc.

As illustrated in FIG. 11, the terminal 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls the overall operations of the terminal 200, such as operations associated with display, telephone calls, data communications, camera operations, and recording operations. The processing component 202 may include one or more processors 220 to execute computer instructions to implement all or part of steps in the method. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support operations in the terminal 200. Examples of these data include computer instructions for any application or method operated on the terminal 200, contact data, phone book data, messages, pictures, videos, etc. The memory 204 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 206 provides power for various components of the terminal 200. The power supply component 206 may include a power management system, one or more power supplies, and other components associated with the generation, management, and distribution of power for the terminal 200.

The multimedia component 208 includes a screen that provides an output interface between the terminal 200 and a target object. In some embodiments, the screen may include a liquid crystal display (LCD) and a touch panel (TP). If the screen includes a touch panel, the screen may be implemented as a touch screen to receive input signals from the target object. The touch panel includes one or more touch sensors to sense touch, sliding, and gestures on the touch panel. The touch sensor may not only sense the boundary of the touch or sliding action, but also detect the duration and pressure related to the touch or sliding operation. In some examples, the multimedia component 208 includes a front camera and/or a rear camera. When the terminal 200 is in an operation mode, such as a shooting mode or a video mode, the front camera and/or the rear camera can receive external multimedia data. Each front camera and rear camera can be a fixed optical lens system or have focal length and optical zoom capabilities.

The audio component 210 is configured to output and/or input audio signals. For example, the audio component 210 includes a microphone (MIC). When the terminal 200 is in an operation mode, such as a call mode, a recording mode, and a voice recognition mode, the microphone is configured to receive external audio signals. The received audio signal can be further stored in the memory 204 or sent via the communication component 216. In some embodiments, the audio component 210 further includes a speaker for outputting audio signals.

The I/O interface 212 provides an interface between the processing component 202 and a peripheral interface module. The above-mentioned peripheral interface module may be a keyboard, a click wheel, a button, and the like.

The sensor component 214 includes one or more sensors for providing the terminal 200 with various status assessments. For example, the sensor component 214 can detect the open/close status of the terminal 200 and the relative positioning of components. For example, the component is the display and the keypad of the terminal 200. The sensor component 214 can also detect the position change of the terminal 200 or a component of the terminal 200, the presence or absence of contact between the target object and the terminal 200, the orientation or acceleration/deceleration of the terminal 200, and the temperature change of the terminal 200. The sensor component 214 may an approximate sensor which is configured to sensor whether an adjacent object exists without any physical contact. The sensor component 214 may further include a light sensor, such as CMOS and CCD image sensor used in an imaging application. In some embodiments, the sensor component 214 may further include a speech sensor, a gyroscope, and a magnetic sensor, a pressure sensor and a temperature sensor.

The communication component 216 is configured to facilitate wired or wireless communication between the terminal 200 and other devices. The terminal 200 can access a wireless network based on a communication standard, such as Wi-Fi, 2G, 3G, 4G, 5G or a combination thereof. In an exemplary embodiment, the communication component 216 receives a broadcast signal or broadcast related information from an external broadcast management system via a broadcast channel. In an exemplary embodiment, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 200 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic components to implement the above-mentioned method.

In some embodiments, there is also provided a non-transitory computer-readable storage medium including executable instructions stored thereon, such as the memory 204 including instructions. The executable instructions may by executed by a processor 220 of the terminal 200 to implement the above-mentioned method. The storage medium may be ROM, random access memory (RAM), CD-ROM, magnetic tape, floppy disk, optical data storage device, etc.

It can be understood that in the disclosure, "plurality" or "multiple" refers to two or more than two. The term "and/or" describes the association relationship of the associated object, indicating that there can be three types of relationships. For example, A and/or B means: A alone exists, both A and B exist, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as first information.

It can be further understood that, unless otherwise specified, "connected" includes a direct connection between the two without other components, and further includes an indirect connection between the two with other elements.

It is further understandable that although the operations in the embodiments of the present disclosure are described in a specific order in the drawings, they should not be understood as requiring these operations to be performed in the specific order shown or in a serial order, or requiring Perform all the operations shown to get the desired result. In certain circumstances, multitasking and parallel processing may be advantageous.

Those skilled in the art will easily come up with other embodiments of the disclosure after considering the description and practicing the disclosure herein. The disclosure is intended to cover any variations, uses or adaptations of the disclosure, and these variations, uses or adaptations follow the general principles of the disclosure and include common general knowledge or frequently used technical means in the technical field not disclosed in the disclosure. The description and the embodiments are only regarded as exemplary, and the true scope and spirit of the disclosure are indicated by the following claims.

It should be understood that the disclosure is not limited to the precise structure described above and shown in the drawings, and various modifications and changes can be made without departing from the scope of the disclosure. The scope of the disclosure is limited only by the appended claims.

What is claimed is:

1. A method for adjusting display brightness of a screen, for a terminal provided with an under-screen image capturing device, the method comprising:

detecting first display brightness within a first display region and detecting second display brightness within a second display region when a display screen of the terminal is displaying an image, the first display region being a region where the under-screen image capturing device is located and the second display region being a remaining region of the display screen of the terminal other than the first display region; and determining grayscale brightness within the first display region when the display screen is displaying the image and adjusting grayscale brightness within the first display region based on the first display brightness and the second display brightness to allow adjusted grayscale brightness within the first display region to be consistent with grayscale brightness within the second display region;

wherein adjusting the grayscale brightness within the first display region comprises:

detecting third display brightness within the first display region and detecting fourth display brightness within the second display region based on grayscale brightness of content displayed on the display screen of the terminal being zero;

determining a difference between the first display brightness and the third display brightness as a first reflected light intensity within the first display region and determining a difference between the second display brightness and the fourth display brightness as a second reflected light intensity within the second display region;

determining a brightness difference between the first display region and the second display region based on the first reflected light intensity and the second reflected light intensity; and adjusting the grayscale brightness within the first display region based on the brightness difference.

2. The method of claim 1, wherein determining the brightness difference between the first display region and the second display region comprises:

determining a product of a film-layer reflectivity of the display screen of the terminal and a transmittance of the first display region as a first conversion coefficient of the first display region and determining a product of a film-layer reflectivity of the display screen of the terminal and a transmittance of the second display region as a second conversion coefficient of the second display region;

determining a ratio of the first reflected light intensity to the first conversion coefficient as first conversion brightness and determining a ratio of the second reflected light intensity to the second conversion coefficient as second conversion brightness; and determining a difference between the first conversion brightness and the second conversion brightness as the brightness difference between the first display region and the second display region.

3. The method of claim 1, wherein adjusting the grayscale brightness within the first display region comprises:

obtaining a brightness value by performing an inverse gamma curve function with a difference between a calculation result of a gamma curve function of the first display region and the brightness difference and determining the brightness value as the grayscale brightness within the first display region.

4. The method of claim 1, comprising:
determining a grayscale value of content displayed within the first display region being greater than a preset grayscale threshold.

5. The method of claim 4, wherein determining the grayscale value of the content displayed within the first display region being greater than the preset grayscale threshold comprises:
determining an image analysis region for the first display region, a size of the image analysis region being greater than a size of the first display region; and
determining the grayscale value is greater than the preset grayscale threshold based on first image display content displayed within the first display region and image display content displayed within the image analysis region.

6. An apparatus for adjusting display brightness of a screen, comprising:
a processor,
a memory, storing computer programs executed by the processor;
wherein when the computer programs stored in the memory are executed, the processor:
detects first display brightness within a first display region and detects second display brightness within a second display region when a display screen of the terminal is displaying an image, the first display region being a region where the under-screen image capturing device is located and the second display region being a remaining region of the display screen of the terminal other than the first display region; and
determines grayscale brightness within the first display region when the display screen is displaying the image and adjusts grayscale brightness within the first display region based on the first display brightness and the second display brightness to allow adjusted grayscale brightness within the first display region to be consistent with grayscale brightness within the second display region;
wherein the processor:
detects third display brightness within the first display region and detects fourth display brightness within the second display region based on grayscale brightness of content displayed on the display screen of the terminal being zero;
determines a difference between the first display brightness and the third display brightness as a first reflected light intensity within the first display region and determines a difference between the second display brightness and the fourth display brightness as a second reflected light intensity within the second display region;
determines a brightness difference between the first display region and the second display region based on the first reflected light intensity and the second reflected light intensity; and
adjusts the grayscale brightness within the first display region based on the brightness difference.

7. The apparatus of claim 6, wherein the processor:
determines a product of a film-layer reflectivity of the display screen of the terminal and a transmittance of the first display region as a first conversion coefficient of the first display region and determines a product of a film-layer reflectivity of the display screen of the terminal and a transmittance of the second display region as a second conversion coefficient of the second display region;
determines a ratio of the first reflected light intensity to the first conversion coefficient as first conversion brightness and determines a ratio of the second reflected light intensity to the second conversion coefficient as second conversion brightness; and
determines a difference between the first conversion brightness and the second conversion brightness as the brightness difference between the first display region and the second display region.

8. The apparatus of claim 6, wherein the processor:
obtains a brightness value by performing an inverse gamma curve function with a difference between a calculation result of a gamma curve function of the first display region and the brightness difference and determines the brightness value as the grayscale brightness within the first display region.

9. The apparatus of claim 6, wherein the processor:
determines a grayscale value of content displayed within the first display region being greater than a preset grayscale threshold.

10. The apparatus of claim 9, wherein the processor:
determines an image analysis region for the first display region, a size of the image analysis region being greater than a size of the first display region; and
determines the grayscale value is greater than the preset grayscale threshold based on first image display content displayed within the first display region and image display content displayed within the image analysis region.

11. A non-transitory computer readable storage medium, wherein when a computer program stored in the non-transitory computer readable storage medium is executed by a processor, the processor:
detects first display brightness within a first display region and detects second display brightness within a second display region when a display screen of the terminal is displaying an image, the first display region being a region where the under-screen image capturing device is located and the second display region being a remaining region of the display screen of the terminal other than the first display region; and
determines grayscale brightness within the first display region when the display screen is displaying the image and adjusts grayscale brightness within the first display region based on the first display brightness and the second display brightness to allow adjusted grayscale brightness within the first display region to be consistent with grayscale brightness within the second display region;
wherein the processor:
detects third display brightness within the first display region and detects fourth display brightness within the second display region based on grayscale brightness of content displayed on the display screen of the terminal being zero;
determines a difference between the first display brightness and the third display brightness as a first reflected light intensity within the first display region and determines a difference between the second display brightness and the fourth display brightness as a second reflected light intensity within the second display region;

determines a brightness difference between the first display region and the second display region based on the first reflected light intensity and the second reflected light intensity; and adjusts the grayscale brightness within the first display region based on the brightness difference.

12. The non-transitory computer readable storage medium of claim 11, wherein the processor:

determines a product of a film-layer reflectivity of the display screen of the terminal and a transmittance of the first display region as a first conversion coefficient of the first display region and determines a product of a film-layer reflectivity of the display screen of the terminal and a transmittance of the second display region as a second conversion coefficient of the second display region;

determines a ratio of the first reflected light intensity to the first conversion coefficient as first conversion brightness and determines a ratio of the second reflected light intensity to the second conversion coefficient as second conversion brightness; and determines a difference between the first conversion brightness and the second conversion brightness as the brightness difference between the first display region and the second display region.

13. The non-transitory computer readable storage medium of claim 11, wherein the processor:

obtains a brightness value by performing an inverse gamma curve function with a difference between a calculation result of a gamma curve function of the first display region and the brightness difference and determines the brightness value as the grayscale brightness within the first display region.

14. The non-transitory computer readable storage medium of claim 11, wherein the processor:

determines a grayscale value of content displayed within the first display region being greater than a preset grayscale threshold.

15. The non-transitory computer readable storage medium of claim 14, wherein the processor:

determines an image analysis region for the first display region, a size of the image analysis region being greater than a size of the first display region; and determines the grayscale value is greater than the preset grayscale threshold based on first image display content displayed within the first display region and image display content displayed within the image analysis region.

* * * * *